(12) United States Patent
El Zur

(10) Patent No.: US 8,230,153 B2
(45) Date of Patent: Jul. 24, 2012

(54) METHOD AND SYSTEM FOR HBA ASSISTED STORAGE VIRTUALIZATION

(75) Inventor: Uri El Zur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1111 days.

(21) Appl. No.: 11/625,182

(22) Filed: Jan. 19, 2007

(65) Prior Publication Data

US 2007/0174850 A1 Jul. 26, 2007

Related U.S. Application Data

(60) Provisional application No. 60/760,447, filed on Jan. 20, 2006.

(51) Int. Cl.
*G06F 3/06* (2006.01)
*G06F 9/26* (2006.01)
*G06F 9/34* (2006.01)
*G06F 3/00* (2006.01)

(52) U.S. Cl. ............. 711/4; 711/203; 711/221; 719/321

(58) Field of Classification Search .................. None
See application file for complete search history.

(56) References Cited

U.S. PATENT DOCUMENTS

| | | | |
|---|---|---|---|
| 7,802,251 B2 * | 9/2010 | Kitamura | 718/1 |
| 2002/0112113 A1 * | 8/2002 | Karpoff et al. | 711/4 |
| 2006/0206603 A1 * | 9/2006 | Rajan et al. | 709/223 |

* cited by examiner

*Primary Examiner* — Kevin Verbrugge
*Assistant Examiner* — Eric S Cardwell
(74) *Attorney, Agent, or Firm* — Thomas, Kayden, Horstemeyer & Risley, LLP

(57) ABSTRACT

Certain aspects of a method and system for host bus adapter assisted storage virtualization are disclosed. Aspects of one method may include loading storage virtualization functionality into one or more of: a storage driver, a network driver, a network interface card (NIC), and a host bus adapter. A SCSI request may be translated to obtain physical target information utilizing a translation table located on one or more of: the storage driver, the network driver, the NIC and the host bus adapter. At least a portion of a plurality of the translated SCSI requests may be cached on the host bus adapter or the NIC.

32 Claims, 12 Drawing Sheets

METHOD AND SYSTEM FOR HBA ASSISTED STORAGE VIRTUALIZATION

CROSS-REFERENCE TO RELATED APPLICATIONS/INCORPORATION BY REFERENCE

This application makes reference to, claims priority to, and claims the benefit of U.S. Provisional Application Ser. No. 60/760,447 filed on Jan. 20, 2006.

This application makes reference to:
U.S. Pat. No. 7,996,569 published Aug. 9, 2011; and
U.S. application Ser. No. 11/623,018 filed Jan. 12, 2007.

Each of the above referenced applications is hereby incorporated herein by reference in its entirety.

FIELD OF THE INVENTION

Certain embodiments of the invention relate to network storage systems. More specifically, certain embodiments of the invention relate to a method and system for host bus adapter assisted storage virtualization.

BACKGROUND OF THE INVENTION

The introduction of high-performance networking between servers and storage assets has caused storage technology to undergo a rapid transformation. The viability of new storage technologies has been affirmed by the rapid adoption of networked storage by virtually every large enterprise and institution. Since the early 1990s, storage innovation has produced a steady stream of new technology solutions, including Fibre Channel, network-attached storage (NAS), server clustering, serverless backup, high-availability dual-pathing, point-in-time data copy, shared tape access, Internet small computer system interface (iSCSI), common information model (CIM)-based management of storage assets and transports, and storage virtualization.

Storage virtualization is the logical abstraction of physical storage systems and may be enabled to hide the complexity of physical storage devices and their specific requirements from management view. Storage virtualization may have tremendous potential for simplifying storage administration and reducing costs for managing diverse storage assets.

The redundant arrays of inexpensive disks (RAID) technology was intended to enhance storage performance and provide data recoverability against disk failure. It also streamlined storage management by reducing disk administration from many physical objects to a single virtual one. Storage virtualization technologies leverage lower-level virtualizing techniques such as RAID, but primarily focus on virtualizing higher-level storage systems and storage processes instead of discrete disk components.

The introduction of storage networking has centralized storage administrative tasks by consolidating dispersed direct-attached storage assets into larger, shared resources on a storage area network (SAN). Fewer administrators may be able to manage more disk capacity and support more servers, but capacity for each server may still be monitored, logical units manually created and assigned, zones established and exported, and new storage assets manually brought online to service new application requirements. In addition, although shared storage may represent a major technological advance over direct-attached storage, it has introduced its own complexity in terms of implementation and support. Finding ways to hide complexity, automate tedious tasks, streamline administration, and still satisfy the requirements of high performance and data availability are challenging tasks.

Another highly advertised objective for storage virtualization is to overcome vendor interoperability issues. Storage array manufacturers may comply with the appropriate SCSI and Fibre Channel standards for basic connectivity to their products. Each, however, may also implement proprietary value-added utilities and features to differentiate their offerings in the market and these, in turn, may pose interoperability problems for customers with heterogeneous storage environments. By virtualizing vendor-specific storage into its vanilla flavor, storage virtualization products may be used to provide data replication across vendor lines. In addition, it may become possible to replicate data from higher-end storage arrays with much cheaper disk assets such as just a bunch of disks (JBODs), thus addressing both interoperability and economic issues.

The concept of a system level storage virtualization strategy includes a utility service that may be accessed reliably and transparently by users. Reliability implies that storage data is highly accessible, protected, and at expected performance of delivery. Transparency implies that the complexity of storage systems has been successfully masked from view and that tedious administrative tasks have been automated on the back end. The abstraction layer of storage virtualization may bear the burden of preserving the performance and data integrity requirements of physical storage while reducing the intricate associations between physical systems to a simple utility outlet into which applications can be plugged.

Various disks that may include cylinders, heads, and sectors may be virtualized into logical block addresses, logical blocks from disparate storage systems may be pooled into a common asset, tape drives and tape systems may be virtualized into a single tape entity, or subdivided into multiple virtual entities, entire file systems may be virtualized into shared file systems, and files or records may be virtualized on different volumes. Virtualization may occur on the host, in storage arrays, or in the network via intelligent fabric switches or SAN-attached appliances. The virtualization may occur via in-band or out-of-band separation of control and data paths. Treating multiple physical disks or arrays as a single logical entity may segregate the user of storage capacity from the physical characteristics of disk assets, including physical location and unique requirements of the physical devices. Storage capacity for individual servers, however, may still be configured, assigned, and monitored.

The abstraction layer that masks physical from logical storage may reside on host systems such as servers, within the storage network in the form of a virtualization appliance, as an integral option within the SAN interconnect in the form of intelligent SAN switches, or on storage array or tape subsystem targets. These alternatives may be referred to as host-based, network-based, or array-based virtualization. The in-band method may place the virtualization engine in the data path, so that both block data and the control information that governs its virtual appearance may transit the same link. The out-of-band method may provide separate paths for data and control, presenting an image of virtual storage to the host by one link and allowing the host to directly retrieve data blocks from physical storage on another.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for host bus adapter assisted storage virtualization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for host bus adapter assisted storage virtualization. Certain aspects of the invention may comprise loading storage virtualization functionality into one or more of: a storage driver, a network driver, a network interface card (NIC), and a host bus adapter. A SCSI request may be translated to obtain physical target information utilizing a translation table located on one or more of: the storage driver, the network driver, the NIC and the host bus adapter. At least a portion of a plurality of the translated SCSI requests may be cached on the host bus adapter or the NIC.

Figure 1A:
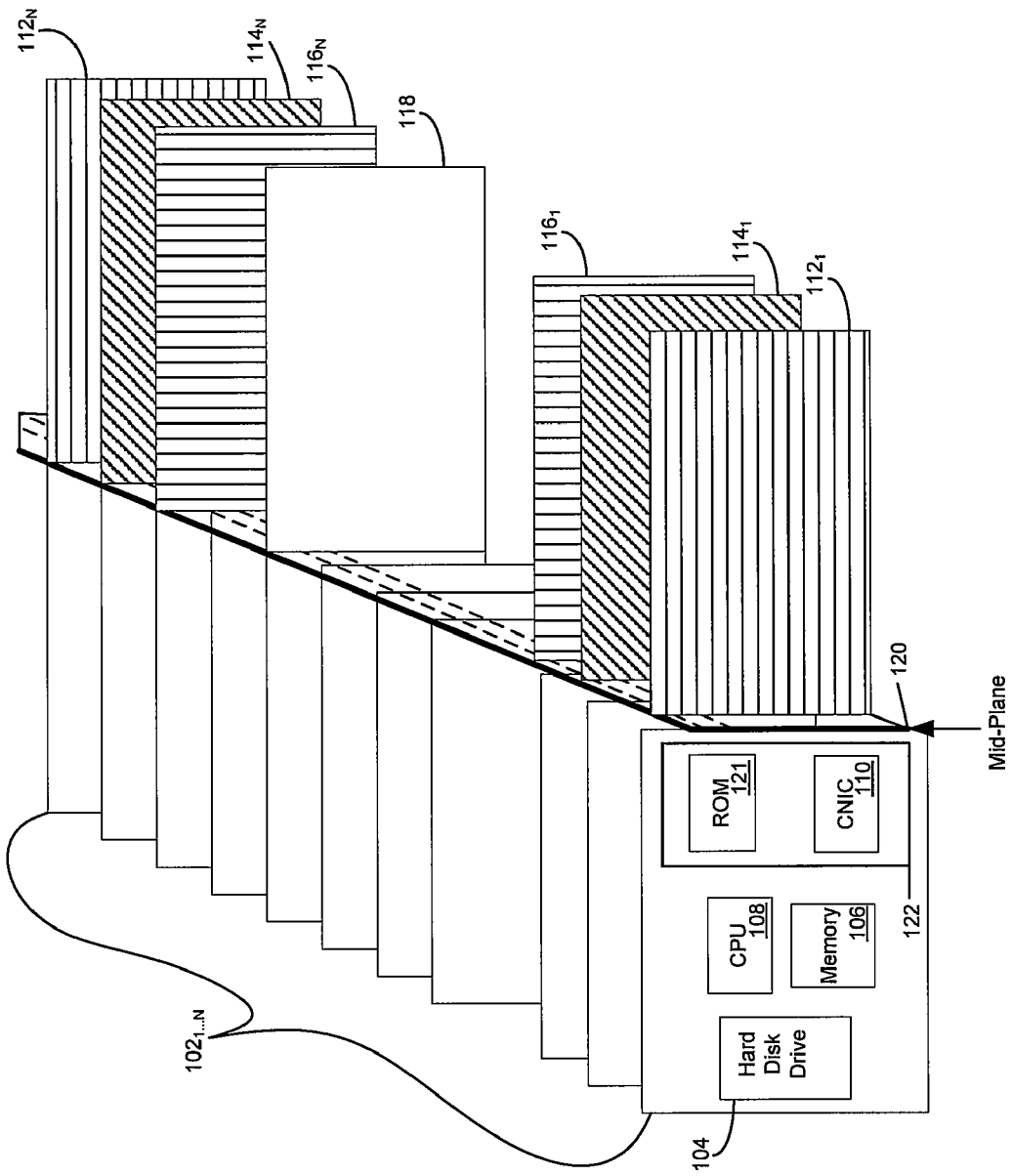
FIG. 1A is a block diagram of a blade system, in accordance with an embodiment of the invention.

FIG. 1A is a block diagram of a blade system, in accordance with an embodiment of the invention. Referring to FIG. 1A, the blade system may comprise a plurality of blade servers $102_{1...N}$, a plurality of network switches $112_{1...N}$, a plurality of storage switches $114_{1...N}$, a plurality of cluster blades $116_{1...N}$, a management blade 118 and a mid-plane 120.

The plurality of blade servers $102_{1...N}$ may each comprise a hard disk drive 104, or several hard drives, a memory 106, a central processing unit 108 and a host bus adapter (HBA) 122. The HBA 122 may comprise a converged network interface card (CNIC) processor 110, and a ROM 121. The hard disk drive 102 may be utilized, for example, for storing blade server boot data. The boot data may be utilized during a blade server boot. The memory 106 may comprise suitable logic, circuitry and/or logic that may enable storage of a master boot record and a boot basic input/output system (BIOS) code. The CPU 108 and the associated BIOS code may comprise suitable logic, circuitry and/or logic that may enable detection of at least one read only memory (ROM) 121 comprising boot BIOS code on at least one host bus adapter (HBA) 122 or a network interface Controller (NIC) adapted for boot operation. The CPU 108 may enable loading of a boot BIOS code into memory 106 if at least one boot ROM 121 comprising boot BIOS code is detected. The CPU 108 may receive an Internet protocol (IP) address and an iSCSI target location of a client. The boot BIOS code may be chained by the CPU to at least one interrupt handler over iSCSI protocol. The CPU 108 may initiate at least one iSCSI connection to the iSCSI target based on chaining at least one interrupt handler. In another embodiment of the invention, the system may boot from a remote target, for example, an iSCSI target.

The HBA 122 may comprise suitable logic, circuitry and/or logic that may enable processing and physical connectivity between a server and a storage device. The HBA 122 may relieve the host microprocessor of both data storage and retrieval tasks, and may improve the server's performance. The CNIC processor 110 may comprise suitable logic, circuitry and/or code that may be enabled to support TCP offload (TOE), iSCSI, and remote direct memory access (RDMA). The CNIC processor 110 may enable a converged fabric for networking, storage, and clustering. The CNIC processor 110 may be utilized in blade servers $102_{1...N}$, where multiple fabrics may require wider backplanes, more power, and more slots.

The plurality of network switches $112_{1...N}$ may comprise suitable logic, circuitry and/or code that may enable interconnection of multiple computers together using a low-level communication protocol such as Ethernet. The plurality of network switches $112_{1...N}$ may enable inspection of the data packets as they are received, determining the source and destination device of that packet, and forwarding that packet accordingly. The plurality of network switches $112_{1...N}$ may conserve network bandwidth by delivering messages to the connected destination or intended destination device.

The plurality of storage switches $114_{1...N}$ may comprise suitable logic, circuitry and/or code that may enable channeling incoming data from multiple input ports to a specific output port that may transport the data toward its intended destination. In case iSCSI is being used, the storage traffic may be converged to the Ethernet fabric, eliminating the need for the dedicated storage fabric. The plurality of cluster blades $116_{1...N}$ may comprise suitable logic, circuitry and/or code that may enable grouping a cluster of server blades to function as a single system. The management blade 118 may comprise suitable logic, circuitry and/or code that may enable management and communication with the plurality of blade servers $102_{1...N}$, plurality of network switches $112_{1...N}$, plurality of storage switches $114_{1...N}$ and the plurality of cluster blades $116_{1...N}$ to an external console. The mid-plane 120 may be utilized by the blade system to interconnect the plurality of blade servers 102₁...ₙ, the plurality of network switches 112₁...ₙ, the plurality of storage switches 114₁...ₙ, the plurality of cluster blades 116₁...ₙ and the management blade 118. In one embodiment of the invention, the mid-plane 120 may be a common bus that interconnects devices coupled thereto.

Figure 1B:
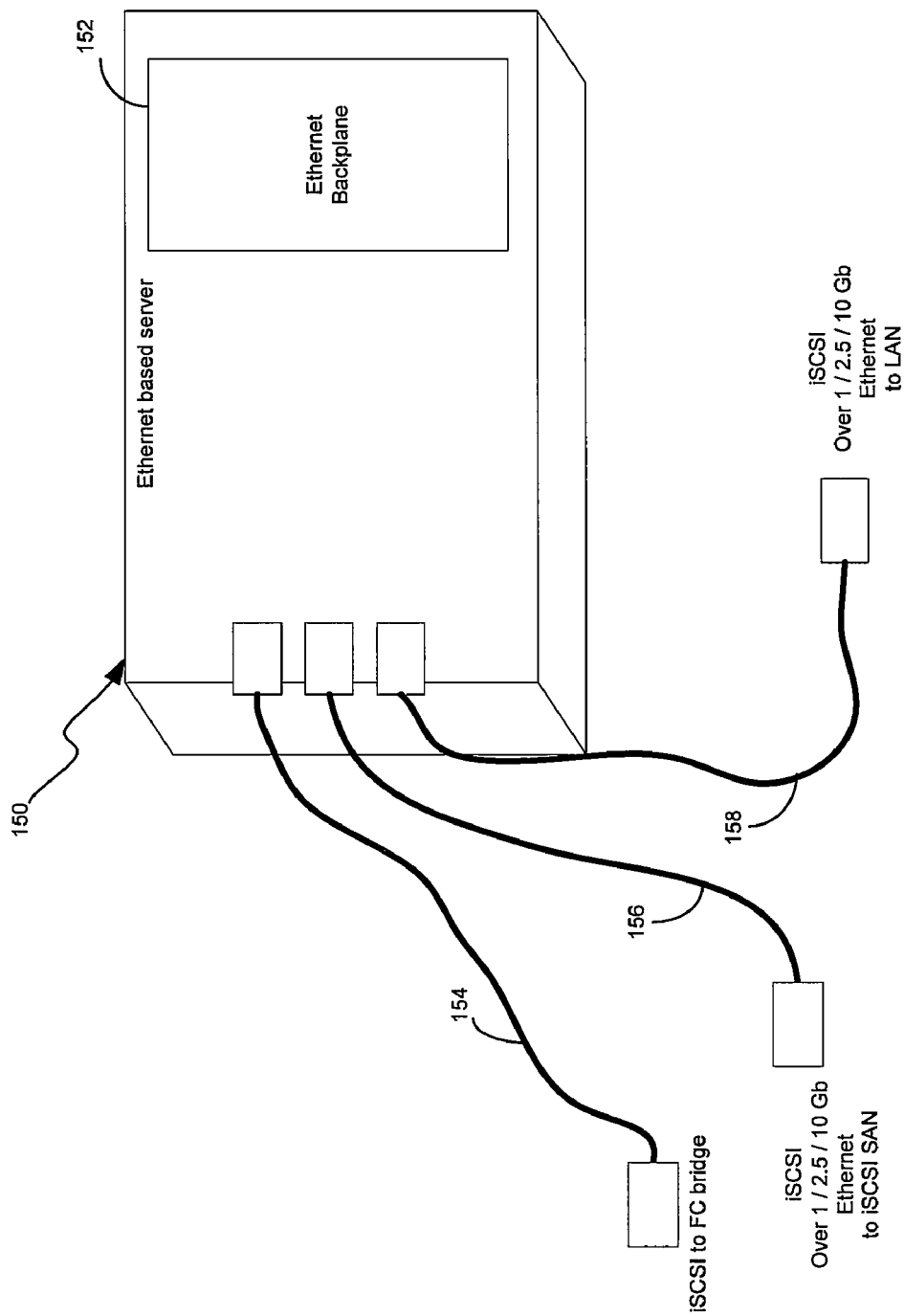
FIG. 1B is a block diagram of a server blade ecosystem, in accordance with an embodiment of the invention.

FIG. 1B is a block diagram of a server blade eco-system, in accordance with an embodiment of the invention. Referring to FIG. 1B, there is shown an Ethernet based blade server 150. The Ethernet-based blade server 150 may comprise an Ethernet backplane 152. The Ethernet based blade server 150 may enable utilization of 1, 2.5 or 10 Gigabit (Gb) or any other speed on the Ethernet backplane 152 for iSCSI and standard local area network (LAN) traffic signals. An Ethernet switch residing inside the blade enclosure or outside, may connect the individual blades to the external networks or blades may be directly connected to an external device. The iSCSI target may reside on another blade inside the chassis. The storage target may be reachable through an optional iSCSI to Fibre Channel (FC) bridge 154 if the target resides on Fibre Channel or directly over 1, 2.5 or 10 Gb Ethernet if the target is a native iSCSI target 156 and the network is dedicated to iSCSI traffic or may be residing and accessible over Ethernet connection 158 that may carry other traffic but storage traffic.

The iSCSI to Fibre Channel (FC) bridge 154 or storage area network (SAN) connection may be utilized to convert iSCSI based signals to FC based signals for processing by a FC SAN, for example. The iSCSI and standard LAN traffic may coexist on a single backplane with a physical separation or a logical separation, for example, a virtual local area network (VLAN). In an exemplary aspect of the invention, an integrated iSCSI redundant array of independent disks (RAID) array on a blade or an external array may be utilized for the OS boot. The iSCSI boot ecosystem may comprise OS image preparation, DHCP server configuration, iSCSI initiator configuration, and iSCSI target configuration.

Figure 1C:
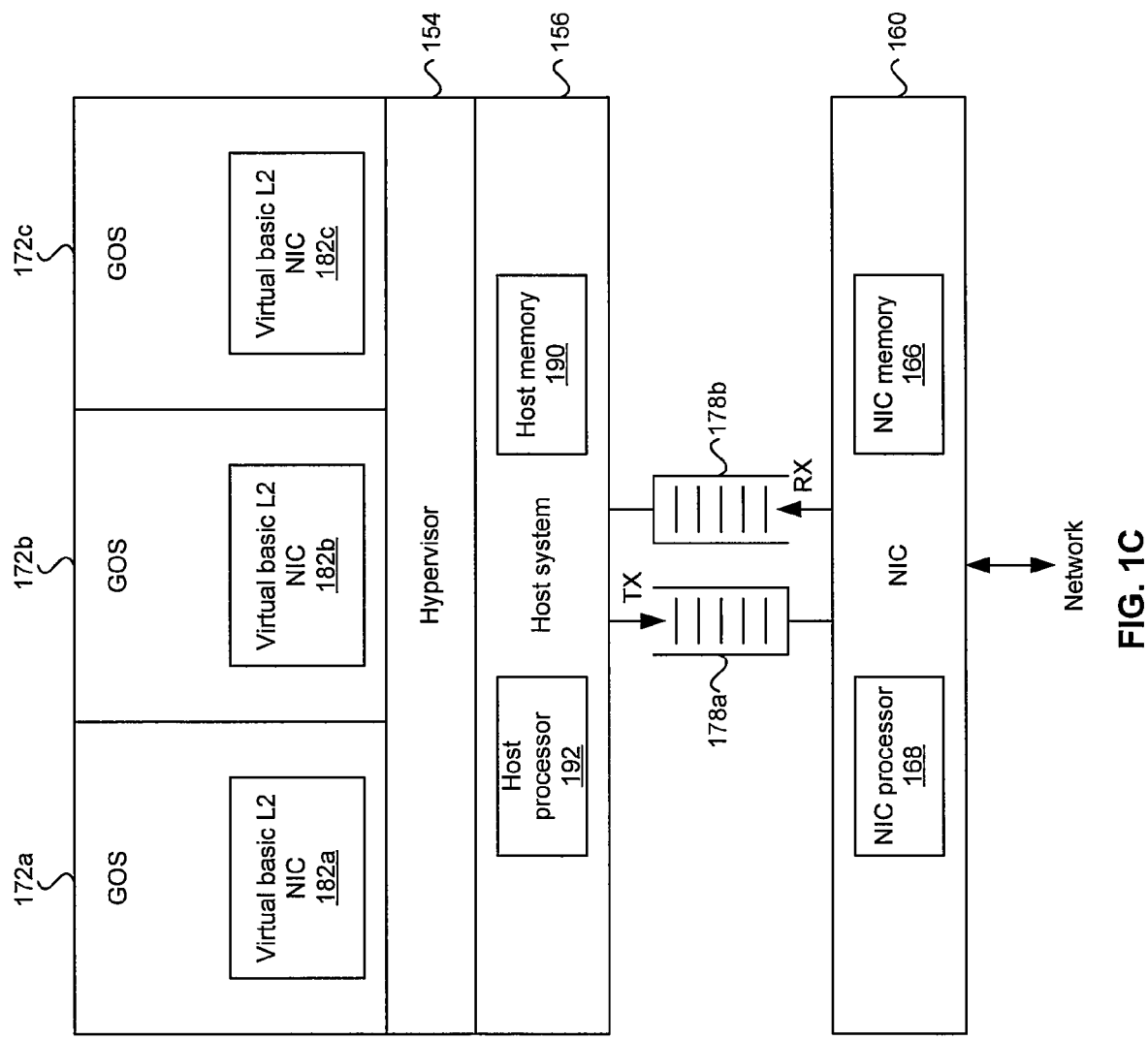
FIG. 1C is a block diagram of a NIC communicatively coupled a host system that supports a plurality of guest operating systems (GOSs) that may be utilized in connection with an embodiment of the invention.

FIG. 1C is a block diagram of a NIC communicatively coupled a host system that supports a plurality of guest operating systems (GOSs) that may be utilized in connection with an embodiment of the invention. Referring to FIG. 1C, there is shown a first GOS 172a, a second GOS 172b, a third GOS 172c, a hypervisor 174, a host system 176, a transmit (TX) queue 178a, a receive (RX) queue 178b, and a NIC 180. The NIC 180 may comprise a NIC processor 188 and a NIC memory 186. The host system 176 may comprise a host processor 192 and a host memory 190.

The host system 176 may comprise suitable logic, circuitry, and/or code that may enable data processing and/or networking operations, for example. In some instances, the host system 176 may also comprise other hardware resources such as a graphics card and/or a peripheral sound card, for example. The host system 176 may support the operation of the first GOS 172a, the second GOS 172b, and the third GOS 172c via the hypervisor 174. The number of GOSs that may be supported by the host system 176 by utilizing the hypervisor 174 need not be limited to the exemplary embodiment described in FIG. 1C. For example, two or more GOSs may be supported by the host system 176.

The hypervisor 174 may operate as a software layer that may enable OS virtualization of hardware resources in the host system 176 and/or virtualization of hardware resources communicatively coupled to the host system 176, such as the NIC 180, for example. The hypervisor 174 may also enable data communication between the GOSs and hardware resources in the host system 176 and/or hardware resources communicatively connected to the host system 176. For example, the hypervisor 174 may enable packet communication between GOSs supported by the host system 176 and the NIC 180 via the TX queue 178a and/or the RX queue 178b.

The host processor 192 may comprise suitable logic, circuitry, and/or code that may enable control and/or management of the data processing and/or networking operations associated with the host system 176. The host memory 190 may comprise suitable logic, circuitry, and/or code that may enable storage of data utilized by the host system 176. The host memory 190 may be partitioned into a plurality of memory regions or portions. For example, each GOS supported by the host system 176 may have a corresponding memory portion in the host memory 190. Moreover, the hypervisor 174 may have a corresponding memory portion in the host memory 190. In this regard, the hypervisor 174 may enable data communication between GOSs by controlling the transfer of data from a portion of the memory 190 that corresponds to one GOS to another portion of the memory 190 that corresponds to another GOS.

The NIC 180 may comprise suitable logic, circuitry, and/or code that may enable communication of data with a network. The NIC 180 may enable level 2 (L2) switching operations, for example. The TX queue 178a may comprise suitable logic, circuitry, and/or code that may enable posting of data for transmission via the NIC 180. The RX queue 178b may comprise suitable logic, circuitry, and/or code that may enable posting of data received via the NIC 180 for processing by the host system 176. In this regard, the NIC 180 may post data received from the network in the RX queue 178b and may retrieve data posted by the host system 176 in the TX queue 178a for transmission to the network. The TX queue 178a and the RX queue 178b may be integrated into the NIC 180, for example. The NIC processor 188 may comprise suitable logic, circuitry, and/or code that may enable control and/or management of the data processing and/or networking operations in the NIC 180. The NIC memory 186 may comprise suitable logic, circuitry, and/or code that may enable storage of data utilized by the NIC 180.

The first GOS 172a, the second GOS 172b, and the third GOS 172c may each correspond to an operating system that may enable the running or execution of operations or services such as applications, email server operations, database server operations, and/or exchange server operations, for example. The first GOS 172a may comprise a virtual NIC 182a, the second GOS 172b may comprise a virtual NIC 182b, and the third GOS 172c may comprise a virtual NIC 182c. The virtual NIC 182a, the virtual NIC 182b, and the virtual NIC 182c may correspond to software representations of the NIC 180 resources, for example. In this regard, the NIC 180 resources may comprise the TX queue 178a and the RX queue 178b. Virtualization of the NIC 180 resources via the virtual NIC 182a, the virtual NIC 182b, and the virtual NIC 182c may enable the hypervisor 174 to provide L2 switching support provided by the NIC 180 to the first GOS 172a, the second GOS 172b, and the third GOS 172c. In this instance, however, virtualization of the NIC 180 resources by the hypervisor 174 may not enable the support of other advanced functions such as TCP offload, iSCSI, and/or RDMA in a GOS.

In operation, when a GOS in FIG. 1C needs to send a packet to the network, transmission of the packet may be controlled at least in part by the hypervisor 174. The hypervisor 174 may arbitrate access to the NIC 180 resources when more than one GOS needs to send a packet to the network. In this regard, the hypervisor 174 may utilize the virtual NIC to indicate to the corresponding GOS the current availability of NIC 180 transmission resources as a result of the arbitration. The hypervisor 174 may coordinate the transmission of packets from the GOSs by posting the packets in the TX queue 178a in accordance with the results of the arbitration operation. The arbitration and/or coordination operations that occur in the transmission of packets may result in added overhead to the hypervisor 174.

When receiving packets from the network via the NIC 180, the hypervisor 174 may determine the media access control (MAC) address associated with the packet in order to transfer the received packet to the appropriate GOS. In this regard, the hypervisor 174 may receive the packets from the RX queue 178b and may demultiplex the packets for transfer to the appropriate GOS. After a determination of the MAC address and appropriate GOS for a received packet, the hypervisor 174 may transfer the received packet from a buffer in the hypervisor controlled portion of the host memory 190 to a buffer in the portion of the host memory 190 that corresponds to each of the appropriate GOSs. In accordance with an embodiment of the invention, several modes may be supported when operating in a OS virtualized environment, for example, the HBA may provide storage virtualization for the whole physical machine and may be coupled to the hypervisor and/or to a trusted GOS such as a parent partition, virtual machine kernel (VMK) or Dom or a driver partition as an example of various virtual machine monitors (VMMs) available. The HBA may provide storage virtualization for all or a subset of the GOSs directly i.e. storage virtualization functionality may reside in a GOS or a GOS driver. A combination of providing storage virtualization for the whole physical machine and/or to a subset of the GOSs directly may be supported and the GOS communication or portions of it, for example, fast path to HBA or CNIC through dedicated queues may be direct from the GOS to HBA.

The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance. U.S. application Ser. No. 11/623,011 filed Sep. 21, 2005, provides a detailed description of a trusted GOS in a virtualized network environment, and is hereby incorporated by reference in its entirety.

Figure 1D:
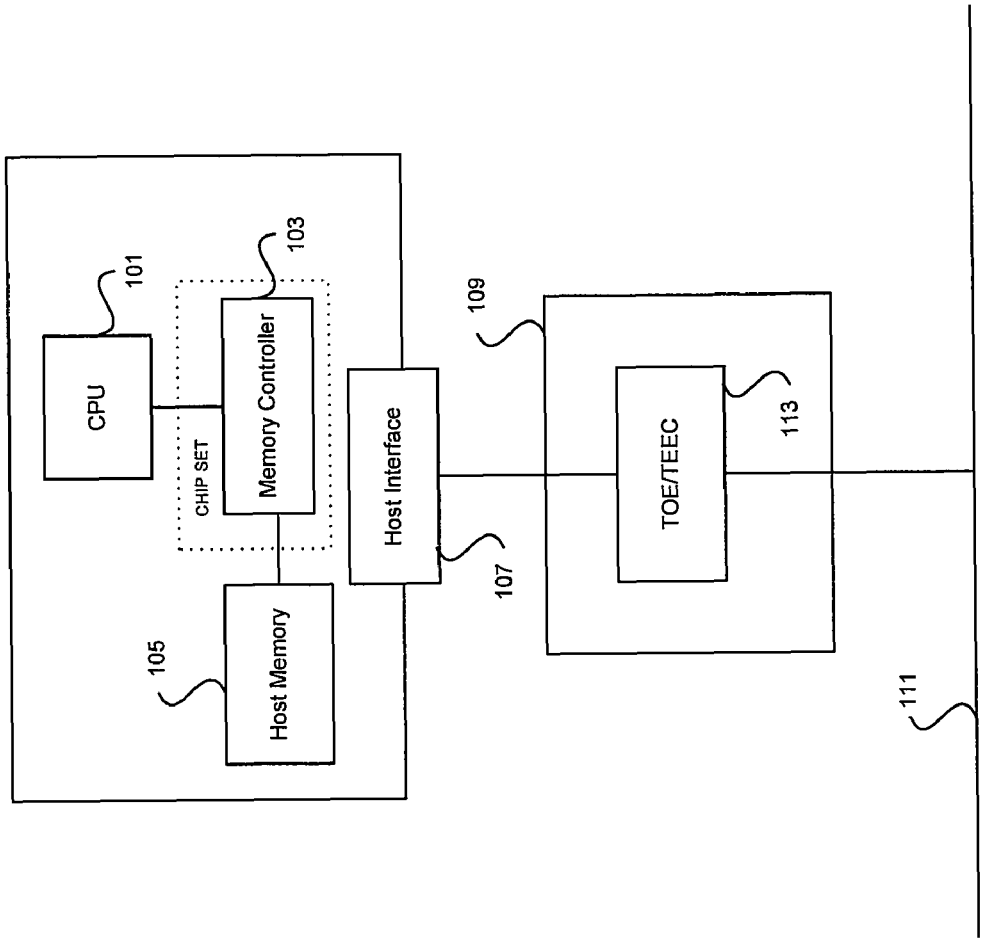
FIG. 1D is a block diagram of an exemplary system for TCP offload, in accordance with an embodiment of the invention.

FIG. 1D is a block diagram of an exemplary system for TCP offload, in accordance with an embodiment of the invention. Accordingly, the system of FIG. 1D may be enabled to handle TCP offload of transmission control protocol (TCP) datagrams or packets. Referring to FIG. 1D, the system may comprise, for example, a CPU 101, a memory controller 103, a host memory 105, a host interface 107, network subsystem 109 and an Ethernet 111. The network subsystem 109 may comprise, for example, a TCP-enabled Ethernet Controller (TEEC) or a TCP offload engine (TOE) 113. The network subsystem 109 may comprise, for example, a network interface card (NIC). The host interface 107 may be, for example, a peripheral component interconnect (PCI), PCI-X, PCI-Express, ISA, SCSI or other type of bus. The memory controller 105 may be coupled to the CPU 103, to the memory 105 and to the host interface 107. The host interface 107 may be coupled to the network subsystem 109 via the TEEC/TOE 113. The TEEC may be enabled to support storage virtualization functionality if iSCSI is processed on TEEC to a certain extent or if no iSCSI processing is performed by the TEEC.

Figure 2:
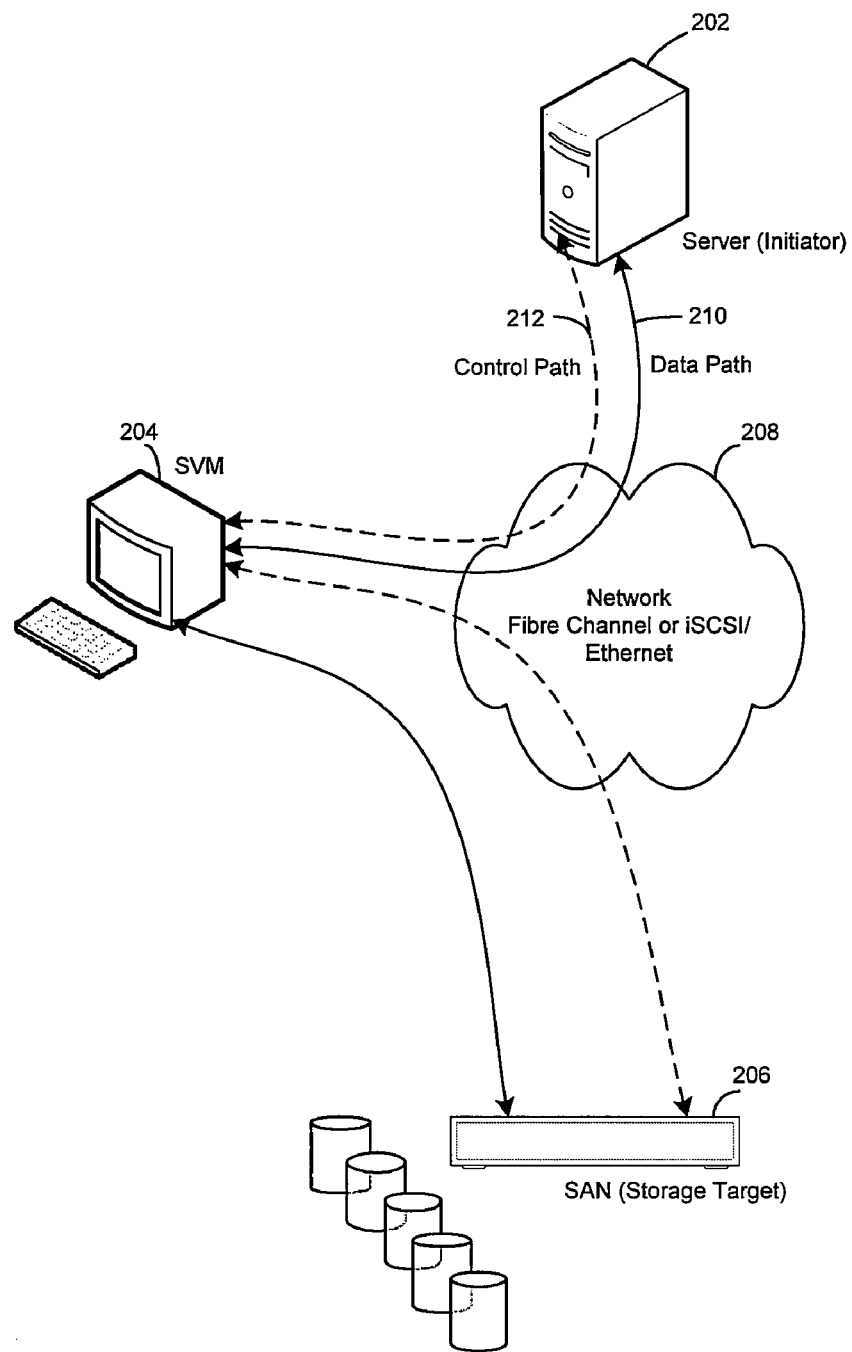
FIG. 2 is a block diagram illustrating storage virtualization, in accordance with an embodiment of the invention.

FIG. 2 is a block diagram illustrating storage virtualization, in accordance with an embodiment of the invention. Referring to FIG. 2, there is shown a server 202, a storage virtualization machine (SVM) 204, a storage area network (SAN) 206, a network 208, a data path 210, and a control path 212.

The server 202 may comprise suitable logic, circuitry and/or code that may be coupled to the SVM 204 and the SAN 206 via the network 208. The server 202 may also be referred to as an initiator as it may initiate a request to the SAN 206. The data path 210 may be routed from the server 202 to the storage target SAN 206 via the SVM 204 and may be enabled to transfer data between the server 202, the SVM 204, and the SAN 206 via the network 208. The control path 212 may be routed from the server 202 to the SVM 204 via the storage target SAN 206 and may be enabled to transfer control information between the server 202, the SVM 204, and the SAN 206 via the network 208. The network 208 may be a Fibre Channel network, or a network based on an iSCSI or Ethernet protocol, for example.

The SAN 206 may be a high-speed special-purpose network or subnetwork that may be enabled to interconnect different kinds of data storage devices with associated data servers on behalf of a larger network of users. The SAN 206 may be enabled to support, for example, disk mirroring, backup and restore, archival and retrieval of archived data, data migration from one storage device to another, and the sharing of data among different servers in a network. Notwithstanding, the SVM 204 may be a stand alone device or may be integrated into the network infrastructure or into the storage target.

The SVM 204 may comprise suitable logic, circuitry and/or code that may be enabled to abstract the storage devices in the SAN 206 from the server 202 which may be request service from the SAN 206. A plurality of parameters in the original request from the server 202 may be changed by the virtualization entity, SVM 204 before they reach the physical storage target, SAN 206.

The SVM 204 may be enabled to abstract multiple hard disks to appear as one to an initiator or server 202. The SVM 204 may increase performance by allowing multiple disks to be involved in servicing an initiator's, for example, server 202 requests. The SVM 204 may be enabled to re-size a logical unit number (LUN) of storage devices attached to a SCSI bus or a target, for example, SAN 206, to a larger size, beyond the capacity of one physical disk allowing for flexibility as the volume of data grows.

The SVM 204 may be enabled to move data from one disk to another without exposing it to the initiator, for example, server 202. The SVM 204 may be enabled to take snapshots of storage data for data recovery (DR), backup, data retrieval or other suitable purposes. The SVM 204 may be enabled to change a plurality of parameters in a received request from an initiator, for example, server 202. For example, the SVM 204 may be enabled to change a target address, the LUN, a data offset in the received request. The SVM 204 may forward the request to a physical target, for example, SAN 206. The SVM 204 may be enabled to split a request from the initiator, for example, server 202 into multiple requests to several physical devices and reassemble the separate responses into a single response that may be transmitted to the original initiator.

In the case of a SCSI write operation, the data from the initiator, for example, server 202 may be transmitted to the SVM 204 and then the SVM 204 may transmit the data to the target, for example, SAN 206. In the case of a SCSI read operation, the request may be transmitted from the server 202 to the SVM 204, and the SVM 204 may transmit the request to one or more targets. In response to the read request, the data may be transmitted from the target, for example, SAN 206 to the SVM 204 and then to the initiator, for example, server 202. The SVM 204 may comprise a bottleneck, where data may be moved twice and may add latency, processing and network load, for example. In accordance with an embodiment of the invention, the SVM 204 may provide re-assembly services for data received from multiple targets to fulfill a single request from the server 202.

The SVM 204 may be enabled to process every request from every initiator attached to it, for example, server 202, before it forwards the request to a target, for example, SAN 206. The SVM 204 may connect to the server over one type of network, for example, iSCSI over Ethernet and may connect to the storage target over a different network, for example, SAN such as Fibre Channel. The SVM 204 may be enabled to lookup data traffic using the initiator identity and the requested information, and may utilize at least one of the initiator's tables to translate the request to one or more requests addressing the physical storage after checking access rights for the specific server. The SVM 204 may remove or edit a header from the protocol data unit (PDU), and replace it with a new header containing the parameters of the physical storage target before sending one or more requests to one or more physical storage devices. The SVM 204 may be enabled to add or edit a header containing the parameters of the physical storage target before it transmits the results of the request to the initiator, for example, server 202. The translation may require re-calculation of the cyclic redundancy check (CRC) value, which may be a per-byte operation with high overhead.

Figure 3:
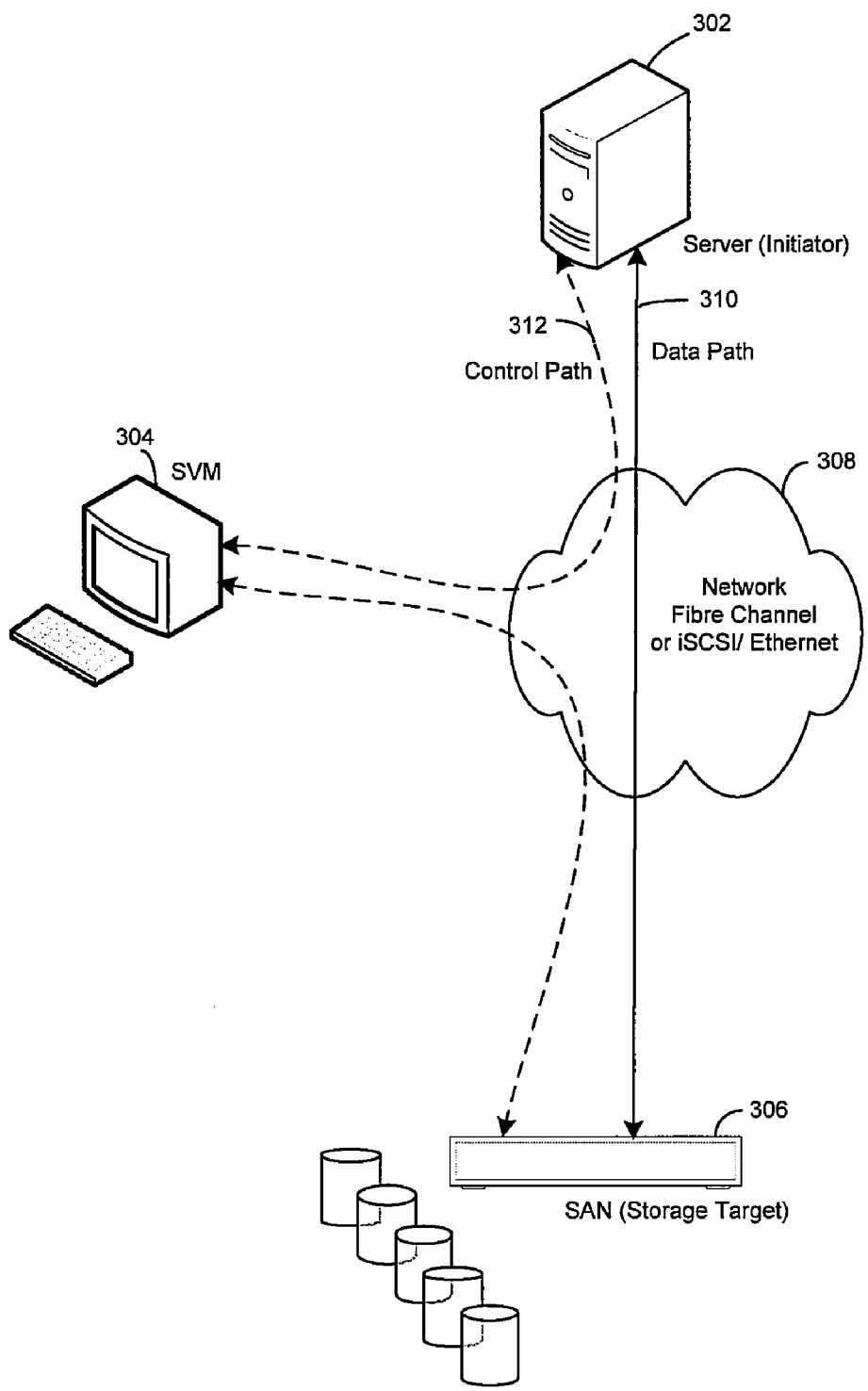
FIG. 3 is a block diagram illustrating another embodiment of storage virtualization, in accordance with an embodiment of the invention.

FIG. 3 is a block diagram illustrating another embodiment of storage virtualization, in accordance with an embodiment of the invention. Referring to FIG. 3, there is shown a server 302, a storage virtualization machine (SVM) 304, a storage area network (SAN) 306, a network 308, a data path 310, and a control path 312.

The server 302 may comprise suitable logic, circuitry and/or code that may be coupled to the SVM 304 via the control path 312 and the network 308. The server 302 may be coupled to the SAN 306 directly via the data path 310 and via the control path 312 and the network 308. The server 302 may also be referred to as an initiator as it may initiate a request to the SAN 306. The data path 310 may be enabled to transfer data between the server 302 and the SAN 306. The control path 312 may be enabled to transfer control information between the server 302, the SVM 304, and the SAN 306 via the network 308. The network 308 may be a Fibre Channel network, or a network based on an iSCSI or Ethernet protocol, for example. The blocks in FIG. 3 may be substantially as described in FIG. 2.

A request from the initiator, for example, server 302 may be transmitted to the SVM 304. The SVM 304 may be enabled to change a plurality of parameters in the request, for example, different target address, different LUN, or a different data offset. The SVM 304 may forward the request to a storage target, for example, SAN 306. The target may view the initiator as the originator of the request.

In the case of a SCSI write operation, the physical target, for example, SAN 306 may transmit its request to transmit (R2T) reply to the SVM 304, which in turn may forward the reply to the initiator, for example, server 302 and may prompt the initiator to transmit its write data directly to the physical target. In the case of a SCSI read operation, a SCSI read command may be transmitted to the SVM 304, which may forward it to the target after modifying one or more of the parameters in the request and the corresponding data may be transmitted from the target, for example, SAN 306 to the initiator, for example, SAN 302.

Figure 4:
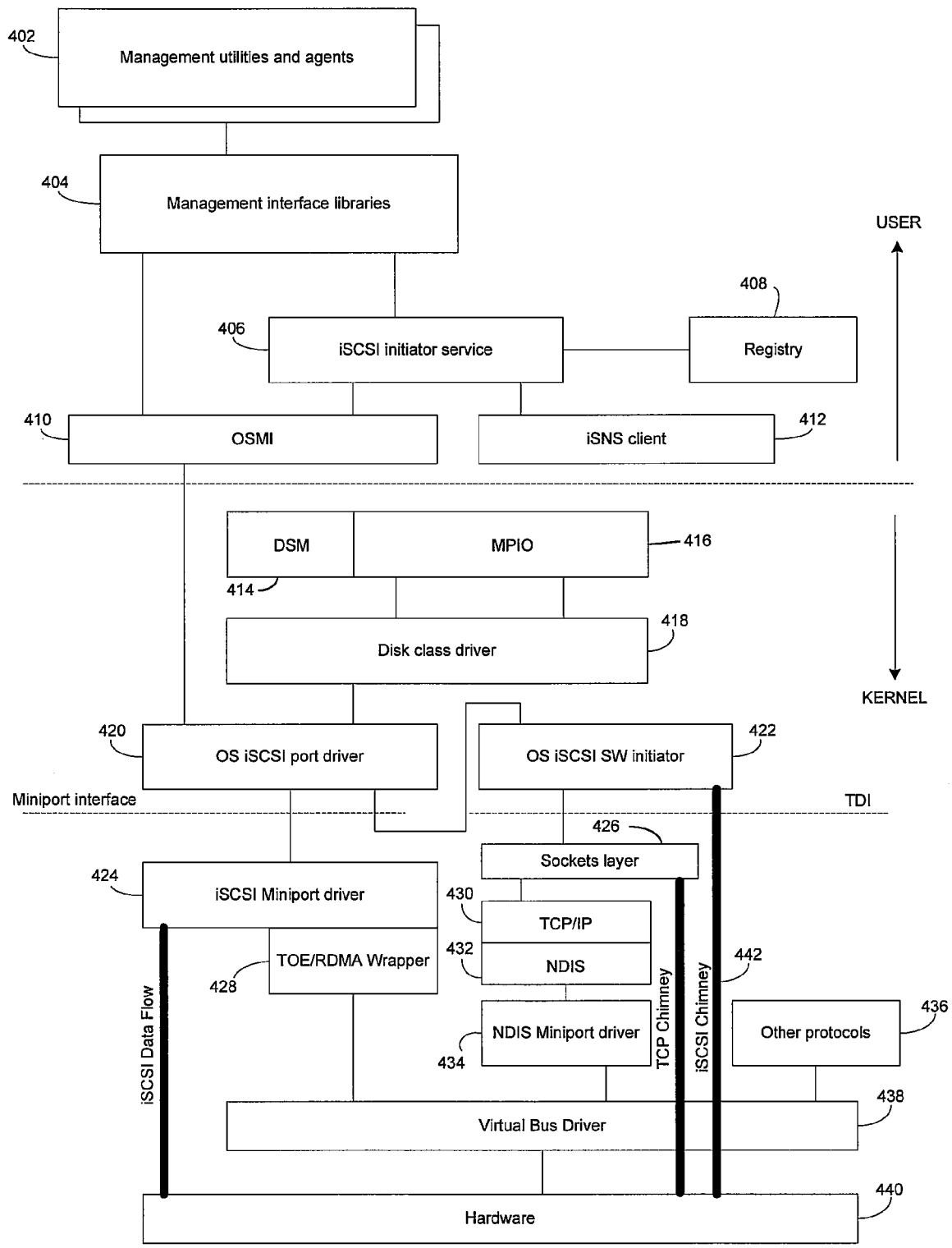
FIG. 4 is a block diagram illustrating the iSCSI software architecture in an iSCSI initiator application that may be utilized in connection with an embodiment of the invention.

FIG. 4 is a block diagram illustrating the iSCSI software architecture in an iSCSI initiator application that may be utilized in connection with an embodiment of the invention. Referring to FIG. 4, there is shown a management utilities and agents block 402, a management interface libraries block 404, an iSCSI initiator service block 406, a registry block 408, a OS Management Instrumentation (OSMI) block 410, and an Internet Storage Name Service (iSNS) client block 412. FIG. 4 also comprises a device specific module (DSM) block 414, a multi-path input output (MPIO) block 416, a disk class driver block 418, a OS iSCSI port driver block 420, an iSCSI software initiator block 422, a sockets layer block 426, a TCP/IP block 430, and a network driver interface specification (NDIS) block 432, a NDIS miniport driver block 434. Additionally, FIG. 4 further comprises an iSCSI miniport driver block 424, a TCP offload engine (TOE)/remote direct memory access (RDMA) wrapper block 428, an other protocols block 436, a virtual bus driver block 438, a hardware block 440 and an iSCSI chimney 442.

The management utilities and agents block 402 may comprise suitable logic, circuitry and/or code that may be enabled to configure device management and control panel applications. The management interface libraries block 404 may comprise suitable logic, circuitry and/or code that may be enabled to manage and configure various interface libraries in the operating system. The management interface libraries block 404 may communicate with the management utilities and agents block 402, the iSCSI initiator service block 406 and the OS Management Instrumentation (OSMI) block 410. The iSCSI initiator service block 406 may be enabled to manage a plurality of iSCSI initiators, for example, network adapters and host bus adapters on behalf of the operating system.

The iSCSI initiator service block 406 may be enabled to aggregate discovery information and manage security. The iSCSI initiator service block 406 may be coupled to the management interface libraries block 404, the registry block 408, the iSNS client block 412 and the OS Management Instrumentation (OSMI) block 410. The registry block 408 may comprise a central hierarchical database that may be utilized by an operating system, for example, Microsoft Windows 9x, Windows CE, Windows NT, Windows 2000, Windows 2003 and Windows Vista to store information necessary to configure the system for one or more users, applications and hardware devices. The registry block 408 may comprise information that the operating system may reference during operation, such as profiles for each user, the applications installed on the computer and the types of documents that each may create, property sheet settings for folders and application icons, what hardware exists on the system, and the ports that are being used.

The OS Management Instrumentation (OSMI) block 410 may be enabled to organize individual data items properties into data blocks or structures that may comprise related information. Data blocks may have one or more data items. Each data item may have a unique index within the data block, and each data block may be named by a globally unique 128-bit number, for example, called a globally unique identifier (GUID). The OSMI block 410 may be enabled to provide notifications to a data producer as to when to start and stop collecting the data items that compose a data block. The OS Management Instrumentation (OSMI) block 410 may be further communicatively coupled to the OS iSCSI port driver block 420.

The Internet Storage Name Service (iSNS) client block 412 may comprise suitable logic, circuitry and/or code that may be enabled to provide both naming and resource discovery services for storage devices on an IP network. The iSNS client block 412 may be enabled to build upon both IP and Fiber Channel technologies. The iSNS protocol may use an iSNS server as the central location for tracking information about targets and initiators. The iSNS server may run on any host, target, or initiator on the network. The iSNS client software may be required in each host initiator or storage target device to enable communication with the server. In an initiator, the iSNS client block 412 may register the initiator and query the list of targets. In a target, the iSNS client block 412 may register the target with the server.

The multi-path input output MPIO block 416 may comprise generic code for vendors to adapt to their specific hardware device so that the operating system may provide the logic necessary for multi-path I/O for redundancy in case of a loss of a connection to a storage target. The device specific module DSM block 414 may play a role in a number of critical events, for example, device-specific initialization, request handling, and error recovery. During device initialization, each DSM block 414 may be contacted in turn to determine whether or not it may provide support for a specific device. If the DSM block 414 supports the device, it may then indicate whether the device is a new installation, or a previously installed device which is now visible through a new path. During request handling, when an application makes an I/O request to a specific device, the DSM block 414 may determine based on its internal load balancing algorithms, a path through which the request should be sent. If an I/O request cannot be sent down a path because the path is broken, the DSM block 414 may be capable of shifting to an error handling mode, for example. During error handling, the DSM block 414 may determine whether to retry the input/output (I/O) request, or to treat the error as fatal, making fail-over necessary, for example. In the case of fatal errors, paths may be invalidated, and the request may be rebuilt and transmitted through a different device path.

The disk class driver block 418 may comprise suitable logic, circuitry and/or code that may be enabled to receive application requests and convert them to SCSI commands, which may be transported in command description blocks (CDBs). The disk class driver block 418 may be coupled to the OS iSCSI port driver block 420. In an operating system, for example, Windows, there might be at least two paths where the networking stack may be utilized. For example, an iSCSI software initiator block 422 may be enabled to support an iSCSI chimney 442 by allowing direct exchange of iSCSI CDBs, buffer information and data to and from the hardware 440 without further copying of the data. In accordance with an embodiment of the invention, a TCP chimney may also be supported or the services of the TCP stack over a L2 NIC may be utilized. The second path may utilize an iSCSI miniport driver 424. The iSCSI miniport driver 424 may interface with the hardware 440 in the same fashion as described above for the iSCSI software initiator block 422.

The use of a potential iSCSI chimney 442 from the hardware 440 to the iSCSI software initiator block 422 eliminates data copy and computing overhead from the iSCSI path. The interface between iSCSI software initiator block 422 and the hardware 440 may also be adjusted to support iSCSI over RDMA known as iSCSI extensions for RDMA (iSER). The iSCSI boot capability may allow the initiator to boot from a disk attached to the system over a network, and iSCSI to communicate with the disk.

The OS iSCSI port driver block 420 may comprise a plurality of port drivers that may be enabled to manage different types of transport, depending on the type of adapter, for example, USB, SCSI, iSCSI or Fiber Channel (FC) in use. The iSCSI software initiator block 422 may be enabled to function with the network stack, for example, iSCSI over TCP/IP and may support both standard Ethernet network adapters and TCP/IP offloaded network adapters, and may also be enabled to support an iSCSI chimney 442. The OS iSCSI port driver 420 may also be enabled to support the iSCSI chimney 442. The iSCSI software initiator block 422 may also support the use of accelerated network adapters to offload TCP overhead from a host processor to the network adapter. The iSCSI miniport driver block 424 may comprise a plurality of associate device drivers known as miniport drivers. The miniport drivers may enable implementation routines necessary to interface with the storage adapter's hardware. A miniport driver may be combined with a port driver to implement a complete layer in the storage stack.

The iSCSI software initiator block 422 or any other software entity that manages and owns the iSCSI state or a similar entity for other operating systems may comprise suitable logic, circuitry and/or code that may be enabled to receive data from the OS iSCSI port driver 420 and offload it to the hardware block 440 via the iSCSI chimney 442. On a target, the iSCSI software target block may also support the use of accelerated network adapters to offload TCP overhead from a host processor to a network adapter. The iSCSI software target block may also be enabled to use the iSCSI chimney 442.

The sockets layer 426 may be used by the TCP chimney and by any consumer that may need sockets services. The sockets layer 426 may be enabled to interface with the hardware 440 capable of supporting TCP chimney. For non-offloaded TCP communication, the TCP/IP block 430 may utilize transmission control protocol/internet protocol that may be enabled to provide communication across interconnected networks. The network driver interface specification NDIS block 432 may comprise a device-driver specification that may be enabled to provide hardware and protocol independence for network drivers and offer protocol multiplexing so that multiple protocol stacks may coexist on the same host. The NDIS miniport driver block 434 may comprise routines that may be utilized to interface with the storage adapter's hardware and may be coupled to the NDIS block 432 and the virtual bus driver (VBD) block 438. The VBD 438 may simplify the hardware 440 system interface and internal handling of requests from multiple stacks on the host. However, use of VBD 438 may be optional with the iSCSI chimney 442.

The iSCSI chimney 442 may comprise a plurality of control structures that may describe the flow of data between the iSCSI software initiator block 422 or the iSCSI miniport driver 424 and the hardware block 440 in order to enable a distributed and more efficient implementation of the iSCSI layer. The TOE/RDMA block 428 may comprise suitable logic, circuitry and/or code that may be enabled to implement remote direct memory access that may allow data to be transmitted from the memory of one computer to the memory of another remote computer without passing through either device's central processing unit (CPU). The TOE/RDMA block 428 may be coupled to the virtual bus driver block 438 and the iSCSI miniport driver block 424. Specifically to iSCSI, it may be enabled to natively support iSER, or NFS over RDMA or other transports relying on RDMA services. These RDMA services may also be supported on a target.

The virtual bus driver block 438 may comprise a plurality of drivers that facilitate the transfer of data between the iSCSI software initiator block 422 and the hardware block 440 via the iSCSI chimney 442. The virtual bus driver block 438 may be coupled to the TOE/RDMA block 428, NDIS miniport driver block 434, the sockets layer block 426, the other protocols block 436 and the hardware block 440. The other protocols block 436 may comprise suitable logic, circuitry and/or code that may be enabled to implement various protocols, for example, the Fiber Channel Protocol (FCP) or the SCSI-3 protocol standard to implement serial SCSI over Fiber Channel networks. The hardware block 440 may comprise suitable logic and/or circuitry that may be enabled to process received data from the drivers, the network interface and other devices coupled to the hardware block 440.

Figure 5:
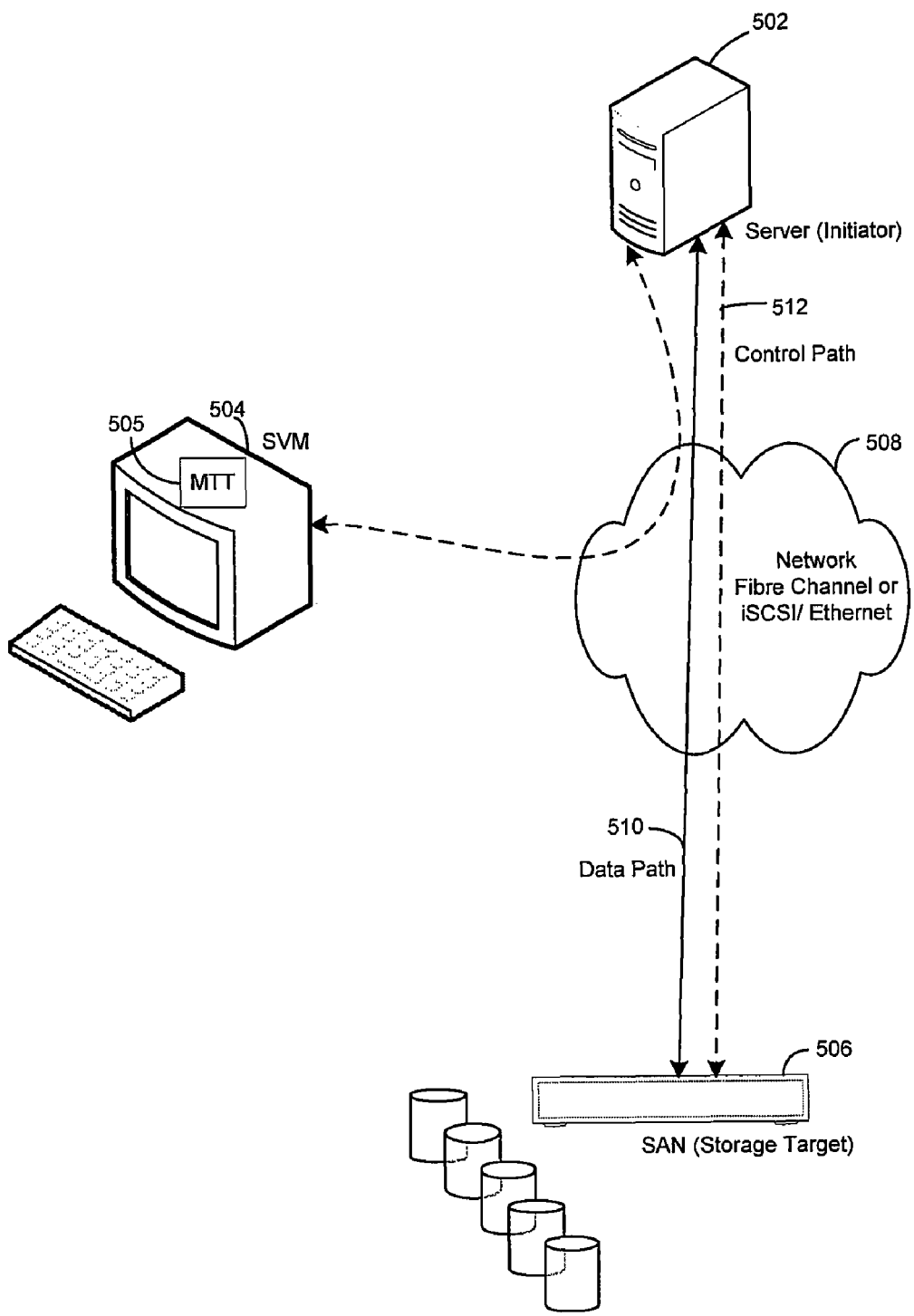
FIG. 5 is a block diagram illustrating initiator resident virtualization, in accordance with an embodiment of the invention.

FIG. 5 is a block diagram illustrating initiator resident virtualization, in accordance with an embodiment of the invention. Referring to FIG. 5, there is shown a server 502, a storage virtualization machine (SVM) 504, a storage area network (SAN) 506, a network 508, a data path 510, and a control path 512. The SVM 504 may comprise a master translation table 505.

The server 502 may comprise suitable logic, circuitry and/or code that may be coupled to the SVM 504 via the control path 512 and the network 508. The server 502 may be coupled to the SAN 506 directly via the data path 510 and the control path 512. The server 502 may also be referred to as an initiator as it may initiate a request to the SAN 506. The data path 510 may be enabled to transfer data between the server 502 and the SAN 506. The control path 512 may be enabled to transfer control information between the server 502, the SVM 504, and the SAN 506 via the network 308. The control path 512 may also be enabled to transfer control information directly between the server 502 and the SAN 506. The network 508 may be a Fibre Channel network, or a network based on an iSCSI or Ethernet protocol, for example. The blocks in FIG. 5 may be substantially as described in FIG. 2.

The SVM 504 may be enabled to share relevant portions of its virtual to physical master translation table 505 with all the initiators served and authorized, if authorization is used, by the SVM 504. The initiator, for example, the server 502 may comprise a storage virtualization agent (SVA) that may utilize the master translation table 505 to modify a plurality of parameters in the SCSI request. For example, a target address, a LUN, or a data offset may be changed. The SVA in the server 502 may forward the request to the physical storage target, for example, SAN 506. The SVA in the server 502 may maintain the translation tables to enable potential addressing at the sector level. A change to a state of any entry in the translation table may require invalidating that entry on other copies of the translation table residing on the initiators.

Figure 6A:
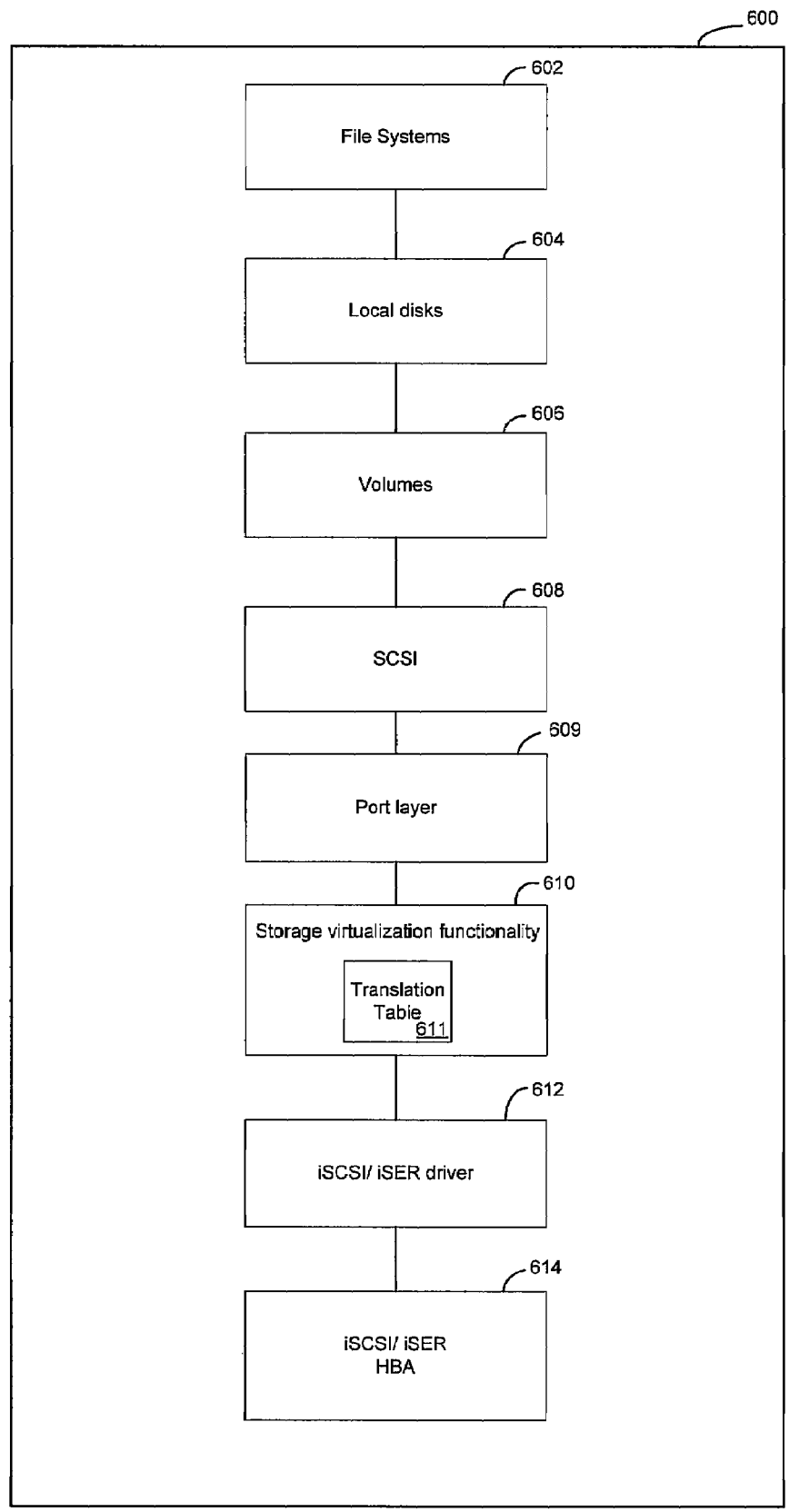
FIG. 6A is a block diagram illustrating software based initiator resident virtualization, in accordance with an embodiment of the invention.

FIG. 6A is a block diagram illustrating software based initiator resident virtualization, in accordance with an embodiment of the invention. Referring to FIG. 6A, there is shown an initiator 600. The initiator 600 comprises a file systems block 602, a local disks block 604, a volumes block 606, a SCSI layer 608, a port layer 609, a storage virtualization functionality (SVF) 610, a iSCSI/iSCSI extension for RDMA transports (iSER) driver 612, and a host bus adapter (HBA) 614. The SVF 610 may comprise a translation table 611.

The file systems block 602 may comprise suitable logic, circuitry and/or code that may be enabled to store and handle application databases and digital archiving. The volumes block 606 may comprise one or more volume drivers that may enable retrieving of the volume configuration from a meta-data center and present virtual volumes to the operating system as if they were disk drives. When the operating system transmits a SCSI request to a virtual volume, the volume driver in the volumes block 606 may intercept the SCSI request, translate the volume address to the physical address, and transmit the SCSI request directly to the storage subsystems in the local disks block 604. The local disks block 605 may be enabled to handle networked storage, if the disk is local or may be enabled to handle virtualized storage.

The SCSI layer 608 may enable creating a SCSI request in a command description block (CDB) structure. The SVF 610 may comprise suitable logic, circuitry and/or code that may be enabled to receive SCSI commands with parameters relating to the virtual storage as viewed by the local OS and applications and convert them to SCSI commands with command description blocks (CDBs) containing parameters relating to the physical storage on the SAN. The port layer 609 may comprise a plurality of port drivers that may be enabled to manage different types of transport, depending on the type of adapter, for example, USB, SCSI, iSCSI or Fiber Channel (FC) in use. The port layer 609 may also be enabled to support the iSCSI chimney 442.

The SVF 610 may be enabled to manage a translation table 611 in conjunction with its interaction with SVM 504 to convert the parameters to the physical parameters. The SVF 610 may translate back the relevant physical storage parameters in the PDU fields upon receiving response from the SAN, for example, the iSCSI/iSER driver 612, to reflect the virtual parameters to the host. The SVF 610 may utilize, for example, a dedicated network connection with the SVM 504, for example, a TCP connection to detect presence, authenticate and exchange translation table 611 update information. The SVF 610 may store a subset of the entries utilized by the initiator 600 in the translation table 611 for instance using the least recently used (LRU) protocol and use the translation table 611 in the SVM 504 to receive the content of a missing entry on demand.

The SVF 610 may either utilize the services of a host TCP/IP stack or may utilize the services of the TCP/IP stack embedded inside the iSCSI/iSER driver 612 and/or the associated HBA 614. In an OS, for example, the Windows OS, the SVF 610 may be referred to as a filter driver. The OS may restrict use of TCP connections from within a filter driver in the storage stack. The OS may also restrict the size of the driver, i.e. its memory foot print, thereby limiting the size of the translation table supported. The OS may restrict translations of any CDB parameter between SCSI layer 608 and iSCSI/iSER driver 612 to simplify conformance/logo tests. The SVF 610 may be required to be integrated and tested with each version and flavor of an OS, the HBA and its driver and different SVFs may be developed for the particular OS to be supported.

The iSCSI/iSER driver 612 may enable providing transport services to the SCSI block 608. The HBA 614 may comprise suitable logic, circuitry and/or code that may enable processing and physical connectivity between the initiator 600 and a storage target, for example, SAN 506. The HBA 614 may relieve the host microprocessor of both data storage and retrieval tasks, and may improve the server's performance.

Figure 6B:
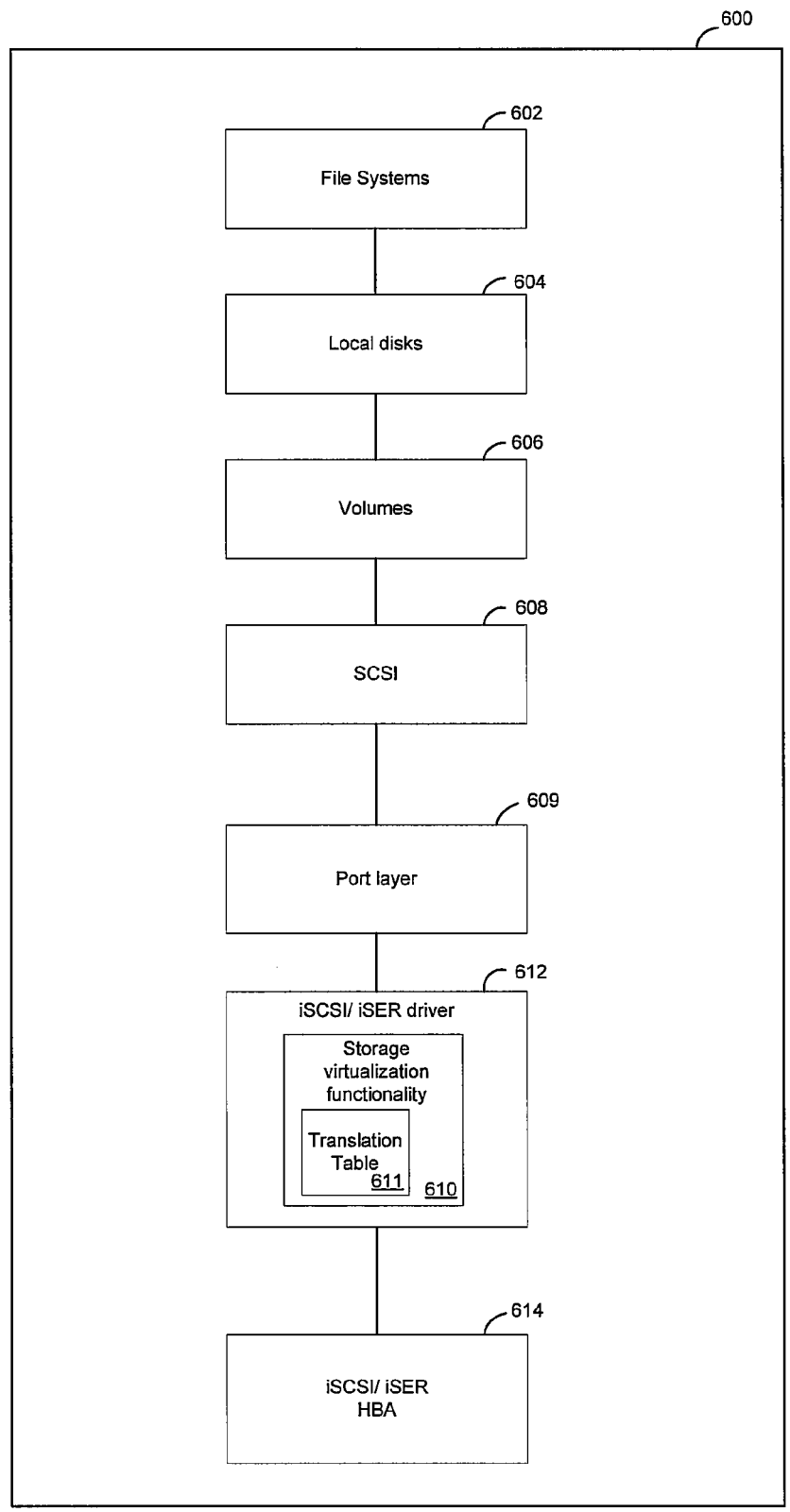
FIG. 6B is a block diagram illustrating iSCSI driver based initiator resident virtualization, in accordance with an embodiment of the invention.

FIG. 6B is a block diagram illustrating iSCSI driver based initiator resident virtualization, in accordance with an embodiment of the invention. Referring to FIG. 6B, there is shown an initiator 600. The initiator 600 may comprise a file systems block 602, a local disks block 604, a volumes block 606, a SCSI layer 608, a port layer 609, an iSCSI/iSER driver 612, and a host bus adapter (HBA) 614. The iSCSI/iSER driver 612 may comprise a storage virtualization functionality (SVF) 610. The SVF 610 may comprise a translation table 611. The blocks in FIG. 6B may be substantially as described in FIG. 6A.

The SVF 610 may be enabled to store a subset of a master translation table 505 maintained by the SVM 504. The translation table 611 in the SVF 610 may comprise recently used translation entries and/or entries obtained from the SVM 504 based on a prediction of the next storage blocks to be accessed. The SVM 504 may maintain a list of entries cached by each initiator 600 and utilize this list to send updates to the initiators. Multiple initiators may have a copy of the same entry, which may complicate the maintenance of the translation table in the SVM 504. The SVM 504 may send updates to the initiators, which may include overhead on the network connecting the initiators to the SVM 504. In accordance with an embodiment of the invention, an OS may restrict the use of additional TCP connections, or a connection from SVM 504 within a driver in the storage stack. The OS may also place a restriction on the size of such a driver, limiting the size of the translation table 611 supported. The OS may restrict translations between SCSI layer 608 and the iSCSI/iSER driver 612 to simplify conformance/logo tests. The SVF 610 may need to be integrated and tested with each version and flavor of an OS, the HBA and its driver and different SVFs may be developed for the particular OS to be supported. The iSCSI/iSER driver 612 may need to be tested for a plurality of models of SVM 504 supported or that may have multiple flavors of the drivers.

Figure 6C:
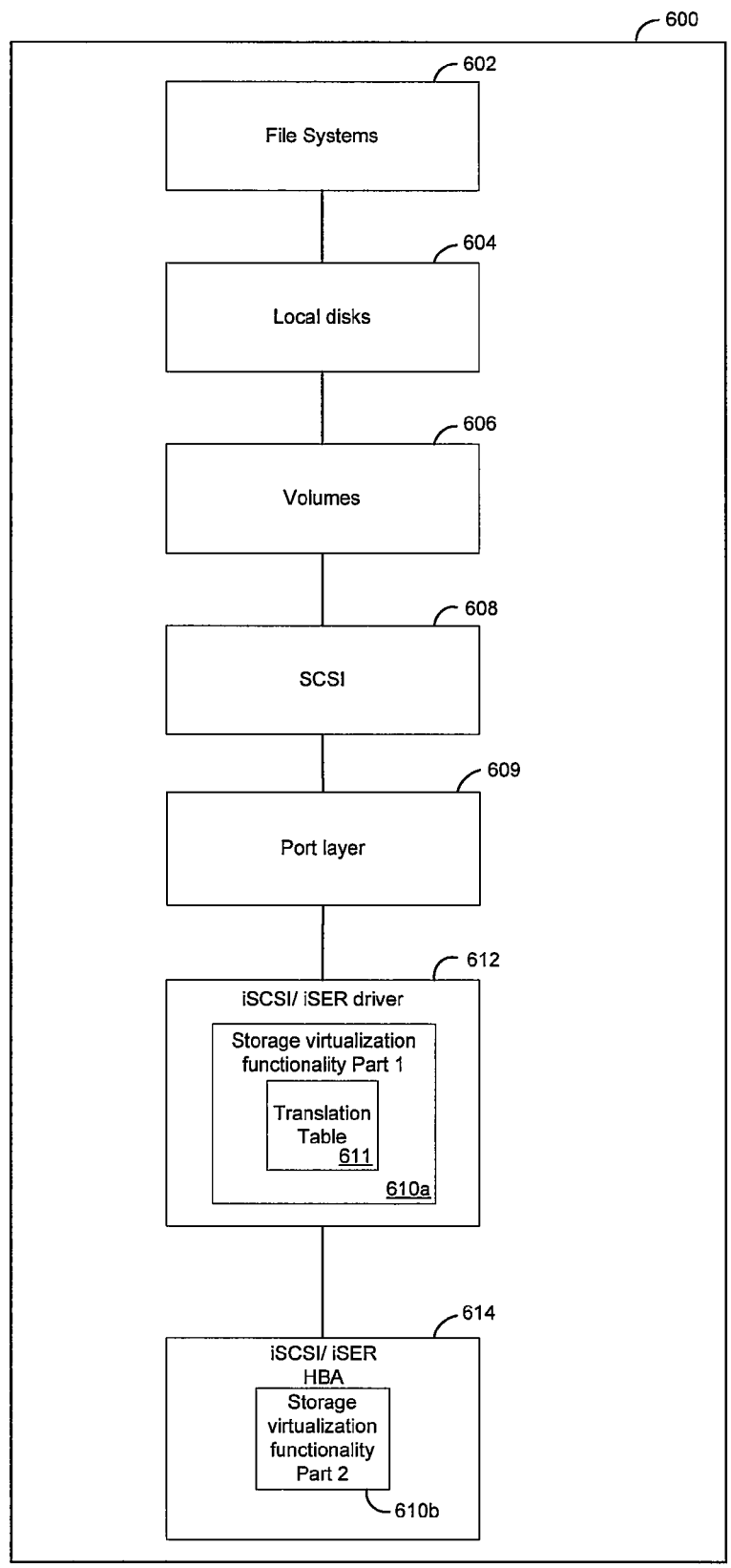
FIG. 6C is a block diagram illustrating host bus adapter assisted storage virtualization, in accordance with an embodiment of the invention.

FIG. 6C is a block diagram illustrating host bus adapter assisted storage virtualization, in accordance with an embodiment of the invention. Referring to FIG. 6C, there is shown an initiator 600. The initiator 600 comprises a file systems block 602, a local disks block 604, a volumes block 606, a SCSI layer 608, a port layer 609, an iSCSI/iSER driver 612, and a host bus adapter (HBA) 614. The iSCSI/iSER driver 612 may comprise a part of the storage virtualization functionality (SVF) part 1 610a. The HBA 614 may comprise a part of the storage virtualization functionality (SVF) part 2 610b. The SVF part 1 610a may comprise a translation table 611. The blocks in FIG. 6C may be substantially as described in FIG. 6A. In accordance with another embodiment of the invention, the translation table 611 may also reside partially in the iSCSI/iSER driver 612 and partially in the HBA hardware 614.

The SVF 610 may be enabled to store a subset of a master translation table 505 maintained by the SVM 504. The translation table 611 in the SVF 610 may include recently used translation entries and/or entries obtained from the SVM 504 based on a prediction of the next storage blocks to be accessed. The translation table 611 may reside either in SVF part 1 610a or in SVF part 2 610b. Alternatively portions of the translation table 611, for example, the most recently used entries or entries expected to be used in the near future may reside in the HBA 614. The protocols required to discover the SVM 504, create and maintain the translation table 611, process updates, and request new entries may reside in either in SVF part 1 610a or in SVF part 2 610b. A connection may need to be supported from the location of the SVF, for example, iSCSI/iSER driver 612 or the HBA 614 to the SVM 504. When the HBA 614 owns the connection, the SVF part 2 610b in the HBA 614 may be enabled to handle TCP or other type of connections, for example, UDP, SCTP or L2. In one embodiment of the invention, the HBA 614 may comprise hardware, firmware, and/or a non-volatile random access memory (NVRAM) without any driver code for the interaction with the SVM 504. The code loaded may be a result of SVM 504 discovery and may support the SVM 504 model used in the system. The HBA 614 may also be enabled to decouple the OS component from the SVM 504 component. The iSCSI/iSER driver 612 may be certified without a need to include the SVM 504, but the HBA 614 and the firmware or logic supporting the SVM 504 may need to be tested together. Specific support for the scheme may be required within the HBA 614. One or both of the SVF part 1 610a and SVF part 2 610b may be enabled to translate the original CDB, and issue a request to the HBA 614. The original CDB may be posted to the HBA 614. The HBA 614 may be enabled to translate and create a new CDB and new iSCSI basic header segment (BHS) and/or an additional header segment (AHS) when used. The SVF 610 or the HBA 614 may be enabled to re-calculate the CRC value.

In one exemplary embodiment of the invention, the SVF part 1 610a may be enabled to control the translation table 611. The iSCSI/iSER driver 612 may be enabled to translate the original SCSI request to reflect physical target information using the translation table 611. If translation is not available, the SVF part 1 610a may send a request for translation to the SVM 504. The subsequent requests from this initiator 600 may be blocked till a translation is available to prevent interference with ordering and interdependency of commands. Alternatively the requests on behalf of the same application or process or thread of the initiator 600 may be blocked or the requests targeting the same LUN or all LUNs associated with the same physical devices may be blocked, but other requests may flow as usual with no delay. The SCSI requests submitted by the iSCSI/iSER driver 612 to a queue between iSCSI/iSER driver 612 and HBA 614 may have been translated prior to being posted to the HBA 614.

In another exemplary embodiment of the invention, the SVF part 1 610a may be enabled to control the translation table 611 and the HBA 614 may be utilized to acquire the translation. The iSCSI/iSER driver 612 may be enabled to translate the original SCSI request to reflect physical target information using the translation table 611. If translation is not available, the SVF part 1 610a may need HBA 614 assistance to obtain the translation. In one exemplary embodiment of the invention, the driver 612 may submit the corresponding SCSI request to a queue between iSCSI/iSER driver 612 and HBA 614 may have a flag indicating whether they have already been translated or not. The HBA 614 may acquire the translation by communicating with the SVM 504 and may update the translation table 611 in the SVF part 1 610a or may reply to the iSCSI/iSER driver 612, which may update the translation table 611. The subsequent requests with no translation may require additional communication with the SVM 504. The HBA 614 may have its own cache of translation and it may change the necessary fields using the translation information. In another exemplary embodiment of the invention, the iSCSI/iSER driver 612 may submit a special translation request to a queue between iSCSI/iSER driver 612 and HBA 614. The HBA 614 may acquire the translation by communicating with the SVM 504 and may submit the results to the iSCSI/iSER driver 612, which in turn may update the translation table 611 in the SVF part 1 610a.

Figure 6D:
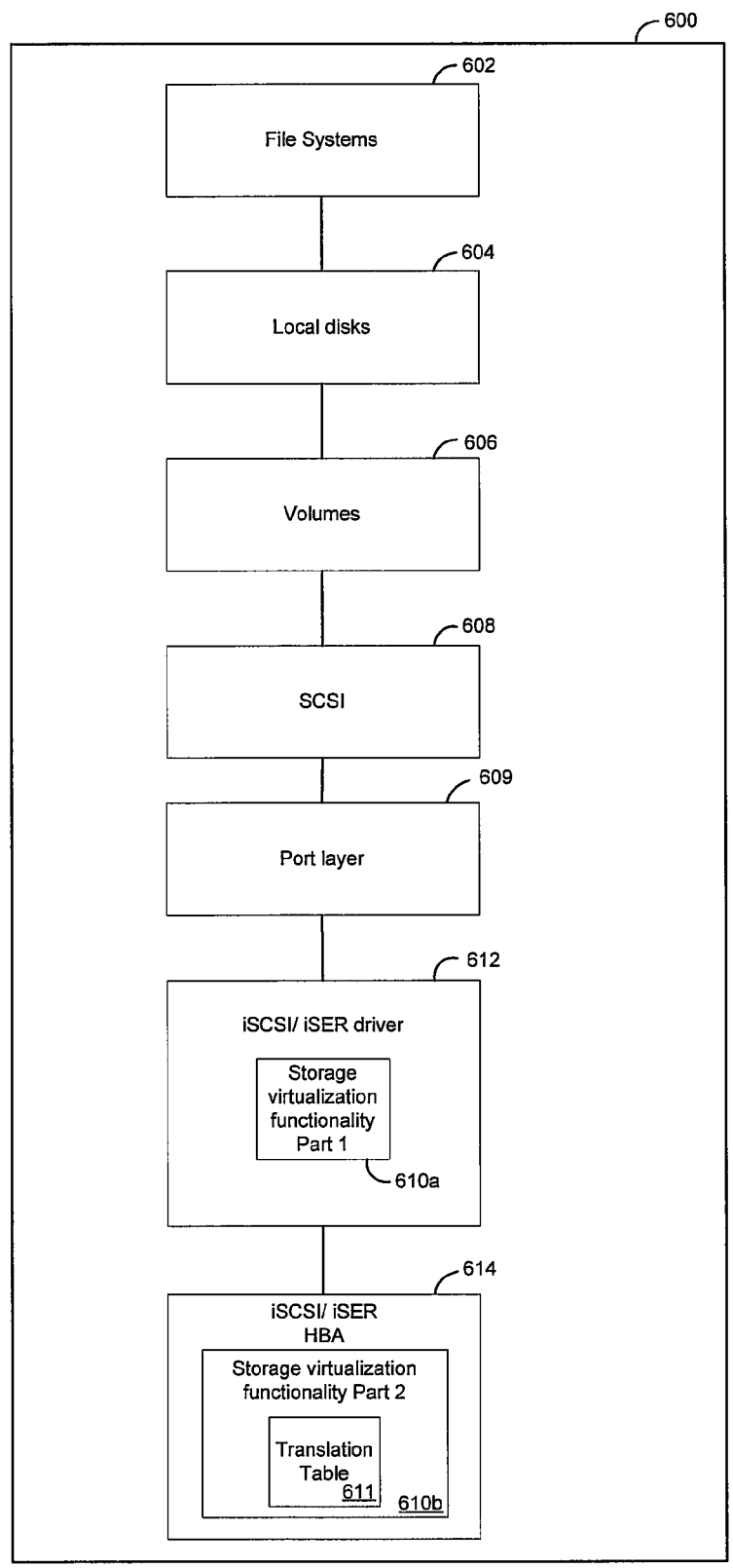
FIG. 6D is a block diagram illustrating another embodiment of a host bus adapter assisted storage virtualization, in accordance with an embodiment of the invention.

FIG. 6D is a block diagram illustrating another embodiment of a host bus adapter assisted storage virtualization, in accordance with an embodiment of the invention. Referring to FIG. 6D, there is shown an initiator 600. The initiator 600 comprises a file systems block 602, a local disks block 604, a volumes block 606, a SCSI layer 608, a port layer 609, an iSCSI/iSER driver 612, and a host bus adapter (HBA) 614. The iSCSI/iSER driver 612 may comprise a part of the storage virtualization functionality (SVF) part 1 610a. The HBA 614 may comprise a part of the storage virtualization functionality (SVF) part 2 610b. The SVF part 2 610b may comprise a translation table 611. The blocks in FIG. 6C may be substantially as described in FIG. 6A.

The SVF part 2 610b may be enabled to control the translation table 611. The SCSI request submitted to a queue between iSCSI/iSER driver 612 and HBA 614 may not be translated. The HBA may acquire the translation by communicating with the SVM 504 and may update the translation table in the SVF part 2 610b. The subsequent SCSI requests with no translation may require additional communication with the SVM 504. The HBA 614 may have its own cache of translation and it may change the necessary fields in any request using the translation information. If translation is not available, the subsequent SCSI requests of a particular initiator 600 with the same LUN as the original request may be blocked till a translation is available to prevent interference with ordering and interdependency of commands. Alternatively the requests on behalf of the same application or process or thread of the initiator 600 may be blocked or only requests targeting the same LUN or all LUNs associated with the same physical devices may be blocked, but other requests may flow as usual with no delay. The HBA 614 may queue non-translated requests, and may create a head-of-line (HOL) blocking, if the HBA 614 is short of storage space. In this case, the HBA 614 may send back a plurality of non-translated requests to the iSCSI/iSER driver 612. When a new translation is available, the HBA 614 may signal the iSCSI/iSER driver 612. The iSCSI/iSER driver 612 may re-submit relevant requests in the original order to the HBA 614. The SCSI requests submitted to a queue between the iSCSI/iSER driver 612 and the HBA 614 may have a flag indicating whether they have already been translated or not.

Alternatively, the HBA 614 may create a separate queue for the requests where translation is not available and for those requests associated with them, for example, to the same LUN even if translation is available. The HBA 614 may manage the queue without any further assistance from the iSCSI/iSER driver 612. When a translation arrives, the HBA 614 may pull out all the requests blocked by lack of that translation from the queue and transmit the requests to the target.

In another exemplary embodiment of the invention, the initiator 600 and/or the entity actively managing the translation table 611 may store the translation table 611 for recent active entries. The initiator 600 may also utilize look ahead techniques to populate the translation table 611 with entries it may need in the near future. The SVM 504 may be enabled to analyze recent requests and transfer them to the initiator's 600 translation table 611. The initiator 600 may execute an application assuming translation information is available in its translation table 611. If the initiator 600 encounters a missing entry in its translation table 611, the initiator 600 may utilize the translation table in the SVM 304 in the control path 312. After populating the entry in the translation table 611 in the initiator 600, the initiator 600 may resume operation. The translation may be subject to LUN masking and zoning when used on the HBA 614. Some SCSI traffic may not be subject to storage virtualization, for example, dedicated iSCSI disk, direct attached storage (DAS). The iSCSI/iSER driver 612 or the HBA 614 may utilize the translation table or other information to determine whether the request is subject to virtual to physical translation. Some pages/disk sectors may be sharable between a plurality of initiators. The translation table 611 may have specific access rights that may be programmable, for example, read only, read/write, or sharable page. Each entry may have a valid/invalid flag. The iSCSI/iSER driver 612 or the HBA 614 may be enabled to check and/or enforce the access rights of the translation table 611.

In accordance with an embodiment of the invention, the SVF 610 may reside on an initiator 600. In another embodiment of the invention, the SVF 610 may be resident in the SVM 504. The SVF 610 may be resident on the HBA part of switch resident storage virtualization. The SVF 610 may be resident on the storage target, for example, SAN 506 that may support storage virtualization.

In accordance with an embodiment of the invention, a method and system for host bus adapter assisted storage virtualization may include an initiator 600 that enables loading of storage virtualization functionality (SVF) 610 into one or more of a storage driver, for example, iSCSI driver 612, a network driver, for example, iSCSI port driver 420, a network interface card (NIC) 180, and a host bus adapter 614. A SCSI request may be translated to obtain physical target information utilizing a translation table 611 located on one or more of: the storage driver, the network driver, the NIC and the host bus adapter. At least a portion of a plurality of the translated SCSI requests may be cached on the host bus adapter 614 or the NIC 180.

A translation table 611 may be enabled for translation of the SCSI request to obtain physical target information, for example, address of a storage target or SAN 506. The initiator 600 may be enabled to determine whether a virtual address corresponding to the SCSI request is located in the translation table 611. The initiator 600 may enable utilization of a master translation table 505 located on a storage virtualization machine 504 to translate the SCSI request to obtain physical target information, if the virtual address corresponding to the SCSI request is not located in the translation table 611. The initiator 600 may enable blocking of subsequent SCSI requests with a similar logical unit number associated with the SCSI request until the virtual address corresponding to the SCSI request is located in the translation table 611. If no translation is available for the SCSI request, other SCSI requests may be allowed, which correspond to one or more of: other logical unit numbers, other targets, and other initiator elements.

The host bus adapter 614 may be enabled to update the translation table 611 based on the utilized entry from the master translation table 505 located on the storage virtualization machine 504. The host bus adapter 614 may be enabled to cache at least a portion of a plurality of the translations relating to the SCSI requests. The initiator 600 may be enabled to modify at least a portion of a plurality of parameters of the SCSI request before translation of the SCSI request to obtain the physical target information. The plurality of parameters of the SCSI request may comprise one or more of a target address, a logical unit number, and a data offset.

The HBA 614 may be enabled to maintain the translation table 611. The SCSI request may be received from an initiator, for example, server 202 or GOS 172. The initiator, for example, server 202 or GOS 172 may lack host software to translate the SCSI request to obtain physical target information and/or may not be aware of the storage virtualization. The storage virtualization functionality may reside either on all guest operating systems or on a subset of guest operating systems. In accordance with an embodiment of the invention, several modes may be supported when operating in a OS virtualized environment, for example, the HBA may provide storage virtualization for the whole physical machine and may be coupled to the hypervisor and/or to a trusted GOS. The HBA may provide storage virtualization for all or a subset of the GOSs directly i.e. storage virtualization functionality may reside in a GOS or a GOS driver. A combination of providing storage virtualization for the whole physical machine and/or to a subset of the GOS communication or portions of it, for example, fast path to HBA or CNIC through dedicated queues may be direct from the GOS to HBA. The loaded storage virtualization functionality SVF 610 may be communicated directly from a guest operating system 172 to one or both of: the host bus adapter 614 and the network interface card 180.

The iSCSI request may be formatted into a TCP segment by a TCP offload engine 113 for transmission and/or may be enabled to support an iSCSI chimney 442 or one of the other methods provided above. In accordance with an embodiment of the invention, similar processing may be performed on the receive path, for example, by providing TCP processing for an Ethernet frame carrying the iSCSI payload and transferring the iSCSI PDU to the higher software layers or processing all or some of the iSCSI PDUs and providing iSCSI payload only to higher software layers.

Another embodiment of the invention may provide a machine-readable storage, having stored thereon, a computer program having at least one code section executable by a machine, thereby causing the machine to perform the steps as described above for host bus adapter assisted storage virtualization.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communication network, the method comprising:
loading by an initiator, storage virtualization functionality into one or more of: a storage driver, a network driver, a network interface card, and/or a host bus adapter; and
translating by said initiator, a SCSI request to obtain physical target information based on a master translation table located on a storage virtualization machine remote from the storage virtualization functionality, if a virtual address corresponding to said SCSI request is not located in a translation table located with the storage virtualization functionality, wherein the translation table contains at least a subset of translation entries maintained in the master translation table.

2. The method according to claim 1, comprising determining whether said virtual address corresponding to said SCSI request is located in said translation table.

3. The method according to claim 1, comprising blocking subsequent SCSI requests with a logical unit number associated with said SCSI request until said virtual address corresponding to said SCSI request is located in said translation table.

4. The method according to claim 1, comprising if no translation is available for said SCSI request, allowing SCSI requests, other than said SCSI request, which correspond to one or more of: logical unit numbers, targets, and/or initiator elements.

5. The method according to claim 1, comprising updating said translation table based on said utilized master translation table located on said storage virtualization machine.

6. The method according to claim 1, comprising caching at least a portion of a plurality of said translated SCSI requests on one or both of: said network interface card and said host bus adapter.

7. The method according to claim 1, comprising modifying at least a portion of a plurality of parameters of said SCSI request before said translation of said SCSI request to obtain said physical target information.

8. The method according to claim 7, wherein said plurality of parameters of said SCSI request comprise one or more of: a target address, a logical unit number, and/or a data offset.

9. The method according to claim 1, comprising maintaining said translation table by one or both of: said network interface card and said host bus adapter.

10. The method according to claim 1, wherein said initiator lacks host software to translate said SCSI request to obtain said physical target information.

11. The method according to claim 1, wherein said loaded storage virtualization functionality resides on one or both of: a virtual machine monitor and a trusted guest operating system.

12. The method according to claim 1, wherein said loaded storage virtualization functionality resides on a guest operating system.

13. The method according to claim 1, wherein said loaded storage virtualization functionality resides on a subset of guest operating systems.

14. The method according to claim 1, wherein said loaded storage virtualization functionality is communicated directly from a guest operating system to one or both of: said host bus adapter and said network interface card.

15. The method according to claim 1, wherein said storage driver is an iSCSI driver.

16. The method according to claim 1, wherein said network driver is an Ethernet driver serving an iSCSI request.

17. A system for handling data in a communication network, the system comprising:
one or more circuits for use in an initiator, said one or more circuits being operable to load storage virtualization functionality into one or more of: a storage driver, a network driver, a network interface card, and/or a host bus adapter; and
said one or more circuits are operable to translate a SCSI request to obtain physical target information based on a master translation table located on a storage virtualization machine remote from the storage virtualization functionality, if a virtual address corresponding to said SCSI request is not located in a translation table located with the storage virtualization functionality, wherein the translation table contains at least a subset of translation entries maintained in the master translation table.

18. The system according to claim 17, wherein said one or more circuits are operable to determine whether said virtual address corresponding to said SCSI request is located in said translation table.

19. The system according to claim 17, wherein said one or more circuits are operable to block subsequent SCSI requests with a logical unit number associated with said SCSI request until said virtual address corresponding to said SCSI request is located in said translation table.

20. The system according to claim 17, wherein said one or more circuits are operable to allow SCSI requests, other than said SCSI request, which correspond to one or more of: logical unit numbers, targets, and/or initiator elements, if no translation is available for said SCSI request.

21. The system according to claim 17, wherein said one or more circuits are operable to update said translation table based on said utilized master translation table located on said storage virtualization machine.

22. The system according to claim 17, wherein said one or more circuits are operable to cache at least a portion of a plurality of said translated SCSI requests.

23. The system according to claim 17, wherein said one or more circuits are operable to modify at least a portion of a plurality of parameters of said SCSI request before said translation of said SCSI request to obtain said physical target information.

24. The system according to claim 23, wherein said plurality of parameters of said SCSI request comprise one or more of: a target address, a logical unit number, and/or a data offset.

25. The system according to claim 17, wherein said one or more circuits are operable to maintain said translation table by one or both of: said network interface card and said host bus adapter.

26. The system according to claim 17, wherein said initiator lacks host software to translate said SCSI request to obtain said physical target information.

27. The system according to claim 17, wherein said loaded storage virtualization functionality resides on one or both of: a virtual machine monitor and a trusted guest operating system.

28. The system according to claim 17, wherein said loaded storage virtualization functionality resides on a guest operating system.

29. The system according to claim 17, wherein said loaded storage virtualization functionality resides on a subset of guest operating systems.

30. The system according to claim 17, wherein said loaded storage virtualization functionality is communicated directly from a guest operating system to one or both of: said host bus adapter and said network interface card.

31. The system according to claim 17, wherein said network driver is an Ethernet driver serving an iSCSI request.

32. A method for handling data in a communication network, the method comprising:
   loading by an initiator, storage virtualization functionality into a host bus adapter;
   translating by said initiator, a SCSI request to obtain physical target information based on a master translation table located on a storage virtualization machine remote from the storage virtualization functionality, if a virtual address corresponding to said SCSI request is not located in a translation table located with the storage virtualization functionality, wherein the translation table contains at least a subset of translation entries maintained in the master translation table; and
   blocking by said initiator, subsequent SCSI requests with a logical unit number associated with said SCSI request until said virtual address corresponding to said SCSI request is located in said translation table.

* * * * *